US008538329B2

(12) United States Patent
Beadle et al.

(10) Patent No.: US 8,538,329 B2
(45) Date of Patent: Sep. 17, 2013

(54) SYSTEM WITH SUB-NYQUIST SIGNAL ACQUISITION AND TRANSMISSION AND ASSOCIATED METHODS

(75) Inventors: Edward R. Beadle, Melbourne, FL (US); Charles Zahm, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 175 days.

(21) Appl. No.: 13/314,867

(22) Filed: Dec. 8, 2011

(65) Prior Publication Data

US 2013/0149959 A1 Jun. 13, 2013

(51) Int. Cl.
*H04B 5/00* (2006.01)

(52) U.S. Cl.
USPC ... 455/41.1; 455/41.2; 455/67.11; 455/67.15; 455/500; 455/502; 455/556.1; 455/556.2; 341/122; 341/123; 341/155; 375/355; 375/240.21; 375/240.26

(58) Field of Classification Search
USPC .................. 455/39, 41.1, 41.2, 67.11, 67.15, 455/500, 502, 556.1, 556.2; 341/155, 120, 341/122, 123, 137, 139; 375/353, 354, 355, 375/240.21, 240.25, 240.26, 240.27
See application file for complete search history.

(56) References Cited

U.S. PATENT DOCUMENTS

| | | | | |
|---|---|---|---|---|
| 7,283,231 | B2 | 10/2007 | Brady et al. | 356/326 |
| 7,289,049 | B1 | 10/2007 | Fudge et al. | 341/123 |
| 7,432,843 | B2 * | 10/2008 | Brady et al. | 341/155 |
| 7,436,912 | B2 * | 10/2008 | Fudge et al. | 375/340 |
| 7,463,174 | B2 * | 12/2008 | Brady et al. | 341/122 |
| 7,463,179 | B2 * | 12/2008 | Brady et al. | 341/155 |
| 7,685,416 | B2 | 3/2010 | Newcombe et al. | 713/155 |
| 7,734,844 | B2 | 6/2010 | Pedersen et al. | 710/36 |
| 7,783,459 | B2 | 8/2010 | Rozell et al. | 702/189 |
| 7,834,795 | B1 * | 11/2010 | Dudgeon et al. | 341/155 |
| 8,457,579 | B2 * | 6/2013 | Mishali et al. | 455/207 |
| 8,487,796 | B2 * | 7/2013 | Baraniuk et al. | 341/139 |
| 2008/0129560 | A1 | 6/2008 | Baraniuk et al. | 341/87 |
| 2008/0228446 | A1 | 9/2008 | Baraniuk et al. | 702/189 |
| 2009/0222226 | A1 | 9/2009 | Baraniuk et al. | 702/66 |
| 2010/0001901 | A1 | 1/2010 | Baraniuk et al. | 342/24 |
| 2010/0177972 | A1 | 7/2010 | Donoho | 382/232 |
| 2010/0246651 | A1 * | 9/2010 | Baheti et al. | 375/224 |
| 2010/0302086 | A1 * | 12/2010 | Dudgeon et al. | 341/155 |
| 2010/0310011 | A1 * | 12/2010 | Sexton et al. | 375/316 |
| 2011/0090394 | A1 | 4/2011 | Tian et al. | 348/424.1 |
| 2011/0136536 | A1 * | 6/2011 | Garudadri et al. | 455/550.1 |
| 2011/0261905 | A1 * | 10/2011 | Shental et al. | 375/316 |
| 2012/0069914 | A1 * | 3/2012 | Shental et al. | 375/259 |

OTHER PUBLICATIONS

Mayiami et al. "*Perfect Secrecy Using Compressed Sensing*".
Kung "*Compressive Sensing: A Potentially Revolutionary Technology*" Version Jun. 3, 2011.
Karumanchi "*A Trusted Storage System for the Cloud*", Jan. 1, 2010.
Wicks et al. "*Wireless Tomography, Part I: A Novel Approach to Remote Sensing*".

OTHER PUBLICATIONS

Kung et al. "*CloudSense: Continuous Fine-Grain Cloud Mnitoring With Compressive Sensing*" Harvard University.

(Continued)

* cited by examiner

Primary Examiner — Tuan A Tran
(74) Attorney, Agent, or Firm — Allen, Dyer, Doppelt, Milbrath & Gilchrist, P.A.

(57) ABSTRACT

A sensing and recovery system includes a sensing unit and a recovery unit coupled together. The sensing unit includes a sensor to generate a bandlimited continuous time analog signal, and a modulator coupled to the sensor to generate a modulated analog signal based upon modulation of the bandlimited continuous time analog signal at a modulating rate at least equal to a Nyquist rate for the bandlimited continuous time analog signal. A compressive sensing circuit is coupled to the modulator to generate a compressed sensed signal based upon conversion of the modulated analog signal at a sampling rate less than the Nyquist rate. The recovery unit recovers the bandlimited continuous time analog signal from the compressed sensed signal.

23 Claims, 7 Drawing Sheets

SYSTEM WITH SUB-NYQUIST SIGNAL ACQUISITION AND TRANSMISSION AND ASSOCIATED METHODS

FIELD OF THE INVENTION

The present invention relates to the field of data communications, and more particularly, to a sensing and recovery system and method using compressive sensing.

BACKGROUND OF THE INVENTION

In digital signal analysis, a signal is typically reconstructed from discrete measurements. Typical approaches to sampling signals or images follow Shannon's theorem wherein a sufficient sampling rate is at least twice the bandwidth (i.e., a lowpass or bandpass bandwidth depending on the signal type) present in the signal. This minimal sampling rate is known as the Nyquist rate or frequency.

This principle underlies nearly all signal acquisition protocols used in consumer audio and video electronics, medical imaging devices, radio receivers, etc. In reference to data conversions, for example, a standard analog-to-digital converter (ADC) implements the quantized Shannon representation in that the signal is uniformly sampled at or above the Nyquist rate.

Even though traditional approaches to data acquisition depend on a Nyquist rate, in many applications the Nyquist rate far exceeds the necessary sample rate needed (or the number of samples over the time record) to accurately reconstruct the signal. For efficient storage or communications of the signal information content, data compression is an important processing step prior to storage or transmission.

However, there are penalties associated with implementing data compression. One such penalty is that the original information bearing signal will likely be sampled above the Nyquist rate, and thus produce many samples with redundant information content about the signal. This process can at times require an ADC with a very high sample rate. High sample rate converters tend to require higher power and are often limited in resolution with respect to their lower sample rate counterparts. This induces a system penalty of low resolution and high power. In some cases it is difficult to even purchase or construct an ADC with the required sample rate given the Nyquist viewpoint of the signal.

Another penalty is induced by the data compression step, as performed with a Karhunen-Loève transform, for example. The data compression step attempts to remove the information redundancy in the samples, induced by the Nyquist view of the conversion, so that a minimal set of samples result to sufficiently represent the information content of the original signal. Implementing compression prior to storage or transmission requires some type of computing resource, which in turn increases the power drawn by the sensor system. The larger the oversampling factor in a Nyquist paradigm, the more severe these penalties become.

Recent developments have shown that compressive sampling or compressive sensing can provide sub-Nyquist rate sampling for communications systems. One such approach is disclosed in U.S. Patent No. 2011/0090394 to Tian et al. A disclosed method of signal processing includes receiving at a processor a data packet comprising compressively sensed or measured data of a signal, with the compressively measured data comprising wavelet transform coefficients. The received signal is a discrete signal, which in turn, requires transform coding before being processed by the processor. The processor reconstructs the signal using a clustering property of the wavelet transform coefficients. A disadvantage of this approach is that transform coding of the discrete signal before being compressively sampled requires additional processing, which in turn consumes power. Additional power consumption may be undesirable, particularly for battery-powered systems.

SUMMARY OF THE INVENTION

In view of the foregoing background, it is therefore an object of the present invention to provide a system that efficiently processes signals using compressive sensing for a reduction in overall size, weight and power relative to traditional signal acquisition approaches.

This and other objects, features, and advantages in accordance with the present invention are provided by a sensing and recovery system comprising a sensing unit including a sensor configured to generate a bandlimited continuous time analog signal, and a modulator coupled to the sensor and configured to generate a modulated analog signal based upon modulation of the bandlimited continuous time analog signal at a modulating rate at least equal to a Nyquist rate for the bandlimited continuous time analog signal. A compressive sensing circuit is coupled to the modulator and is configured to generate a digital signal based upon conversion of the modulated analog signal at a sampling rate less than the Nyquist rate of the original source signal. A recovery unit is coupled to the sensing unit and is configured to recover data samples that would have resulted from Nyquist sampling of the original source signal. The recovered discrete-time samples are then converted to a bandlimited continuous time analog signal.

The sensor advantageously senses the continuous time analog data in its inherent or indigenous domain. The input signal, once modulated, may then be passed directly to the compressive sensing circuit without the sensing unit having to perform any sort of transform coding on the signal before being compressively sampled.

The compressive sensing circuit may comprise an analog-to-digital converter or digitizer, for example. Also, the sample rate in the compressive sensing circuit is substantially reduced from Nyquist-based paradigms. Because the sensing unit need not oversample and compress the bandlimited continuous time analog signal, processing steps typical of Nyquist-based data acquisition are avoided, thus resulting in a savings of size, weight and power of the sensor, as well as, a reduction in storage or communication requirements for the sensed data.

The sensing unit may further comprise a forward error correction (FEC) module configured to add error correction symbols to the compressed sensed signal. Similarly, the receiving unit may further comprise an error detection and correction module configured to correct for errors in the compressed sensed signal based on the error correction symbols added by said FEC module.

The sensing unit may further comprise a data integrity module configured to add authentication symbols to the compressed sensed signal. Similarly, the receiving unit may further comprise an integrity check module configured to authenticate the sensing unit based on the authentication symbols added by the data integrity module.

Another aspect is directed to a method for sensing data comprising generating a bandlimited continuous time analog signal, and generating a modulated analog signal based upon modulation of the bandlimited continuous time analog signal at a modulating rate at least equal to a Nyquist rate for the bandlimited continuous time analog signal. A compressed sensed signal is generated upon conversion of the modulated analog signal at a sampling rate less than the Nyquist rate. The method may further comprise transmitting the compressed sensed signal to a recovery unit.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Compressive sensing enables a high resolution capture of physical signals from relatively few measurements, which may be well below the number expected from the requirements of the Shannon/Nyquist sampling theorem. Compressive sensing makes use of a sparse representation for the received signal, and then measurements are used to extract the maximum amount of information from the sparse representation for the received signal using a minimum amount of measurements.

Compressive sensing as discussed herein is initially focused on the processing of continuous time and continuous amplitude bandlimited waveforms, commonly referred to as analog signals. More specifically, the subject signals of interest are analog signals that have a sparse representation in an analysis domain.

As will be explained in greater detail below, signal acquisition and transmission of analog signals using compressive sensing allows for a number of benefits, such as power reduction for a battery-powered system, a system that is signal agnostic when acquiring signals, a system that has a low probability of intercept when transmitting signals, a system that can recover the signals without aliasing errors, and a system that is resistant to spoofing.

Figure 1:
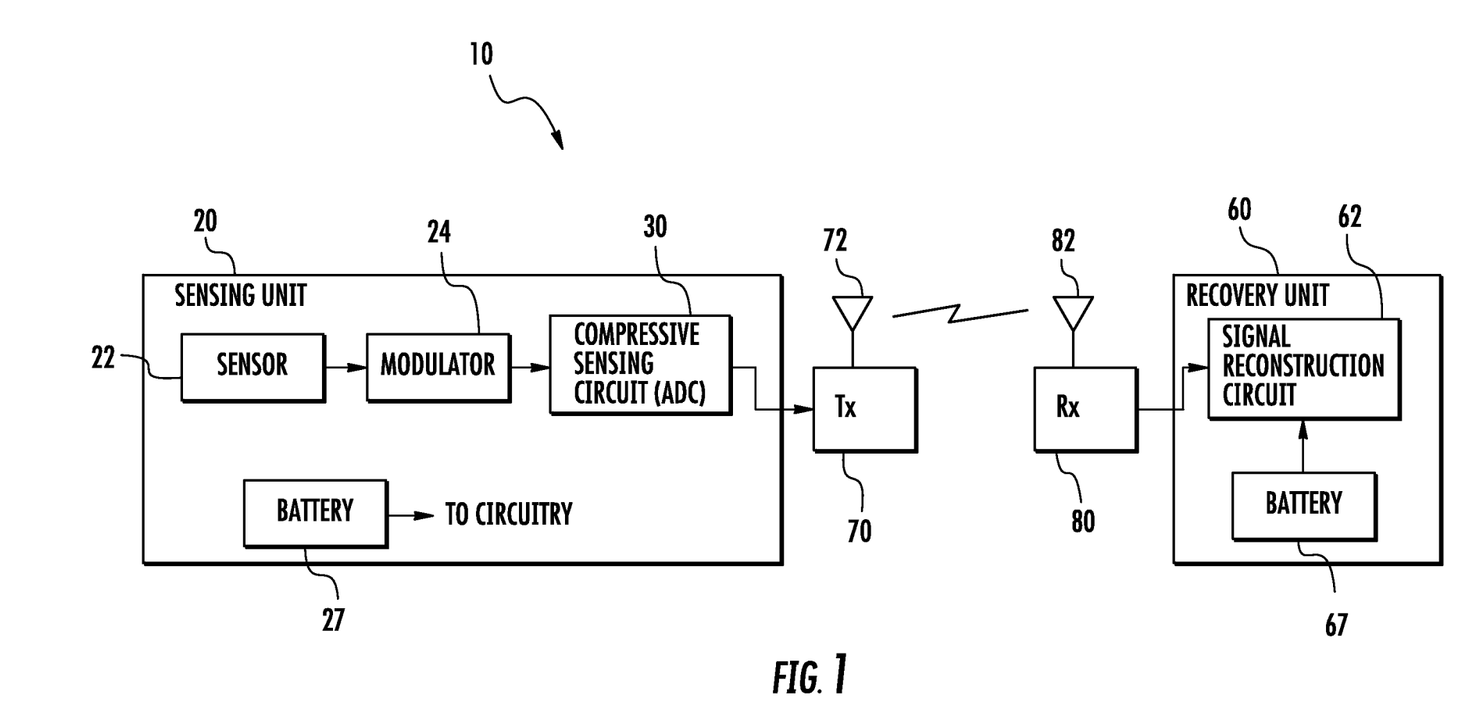
FIG. 1 is a block diagram of a sensing and recovery system in accordance with the present invention.

Referring initially to FIG. 1, a sensing and recovery system 10 includes a sensing unit 20 and a recovery unit 60. The sensing unit 20 includes a sensor 22 to generate a bandlimited continuous time analog signal. A modulator 24 is coupled to the sensor to generate a modulated analog signal based upon modulation of the bandlimited continuous time analog signal at a modulating rate at least equal to a Nyquist rate for the bandlimited continuous time analog signal.

A compressive sensing circuit 30 is coupled to the modulator 24 to generate a compressed sensed signal based upon conversion of the modulated analog signal at a sampling rate less than the Nyquist rate. The recovery unit 60 is coupled to the sensing unit 20, and includes a signal reconstruction circuit 62 to recover the bandlimited continuous time analog signal from the compressed sensed signal. The circuitry of the sensing unit 20 and the recovery unit 60 are illustratively powered by their respective batteries 27, 67.

A transmitter 70 is coupled to the sensing unit 20, and a receiver 80 is coupled to the recovery unit 60. The compressed sensed signal generated by the sensing unit 20 is provided to the transmitter 70 for transmission via an antenna 72 to the receiver 80. The transmitted signal is received by the receiver 80 via an antenna 82, which then provides the compressed sensed signal to the recovery unit 60.

In the illustrated embodiment, the interface between the sensing and recovery system 10 is a wireless interface. Transmission of the compressed sensed signal is not limited to any particular frequency or transmission scheme, as readily appreciated by those skilled in the art. Alternatively, the interface between the sensing unit 20 and the recovery 60 may be a wired interface. Other configurations include the transmitter 70 and receiver 80 configured as modems, for example.

The sensing unit 20 and the sensor 22 are signal agnostic, which means that the sensor is not customized for any specific signal type. The bandlimited continuous time analog signal can be any analog signal that is also continuous in amplitude. The analog signal can exist in any domain that is naturally occurring, such as in the frequency domain, time domain, audio, pressure, and even images, for example. Essentially, the bandlimited continuous time analog signal can be based on any physically sensed variable.

In the healthcare field, the sensing unit 20 may be used to monitor a patient's heart rhythm, for example. Another application is with respect to spectral monitoring. In spectral monitoring, the sensing unit 20 looks for narrowband signals in a large surveillance bandwidth. The bandwidth may be in the GHz range, for example. The signals are advantageously sampled at a rate less than the Nyquist rate, yet the recovery unit 60 is able to recover the signals without aliasing.

Figure 2:
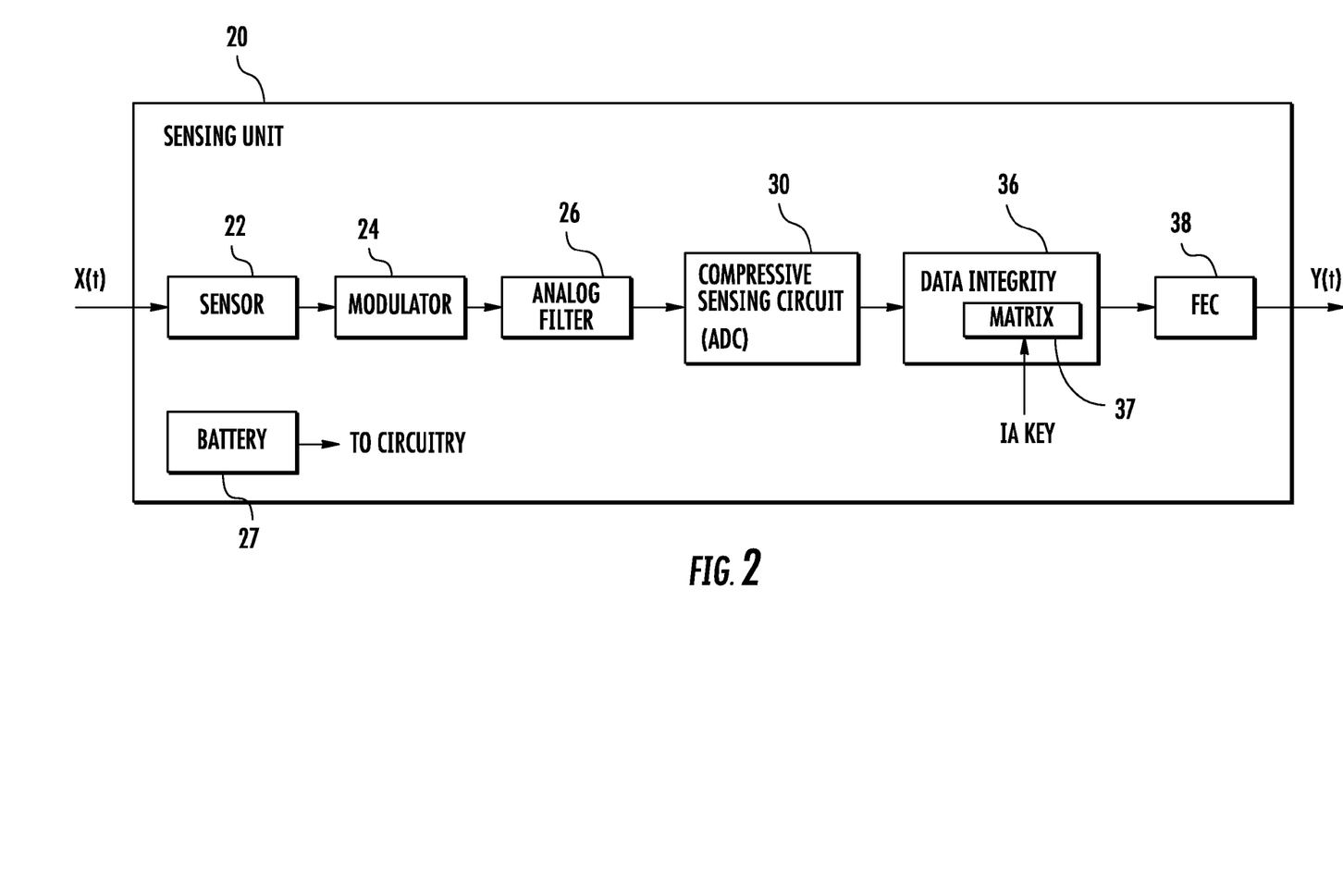
FIG. 2 is a more detailed block diagram of the sensing unit shown in FIG. 1.

A more detailed block diagram of the sensing unit 20 will now be discussed in reference to FIG. 2. The sensor 22 senses analog data and provides a bandlimited continuous time analog signal, represented as x(t), to the modulator 24. The signal x(t) is in its inherent or indigenous domain.

The illustrated modulator 24 is a bi-phase modulator that multiplies the bandlimited continuous time analog signal by +1 and −1 to generate a modulated analog signal. The purpose of the modulator 24 is to spread the frequency content of the input signal so that the information content is not destroyed by the low pass filter 26. The bi-phase modulator 24 has a bi-phase modulation rate that meets or exceeds the Nyquist rate of the sensed signal. The bi-phase modulation may also be randomly generated. As readily appreciated by those skilled in the art, the modulator 24 is not limited to a bi-phase modulator, and there exist many methods of generating a random bi-phase signal. However, the recovery unit 60 needs to know the exact sequence of the modulation in order to properly decode the transmitted data. Consequently, the sensing unit 20 and the recovery unit 60 are synchronized.

The modulated analog signal is passed through an analog low pass filter 26. The analog filter 26 has a filter response of h(t), which may be arbitrary but is known by the recovery unit 60. The filtered modulated analog signal is passed directly to the compressive sensing circuit 30.

The combination of the modulator 24, the analog filter 26 and the compressive sensing circuit 30 provides a sufficient number of samples to reconstruct the original signal, but at a sample rate below the Shannon/Nyquist predictions. The processing steps and power consumption of typical Nyquist theory data acquisition systems are avoided, which, in turn, prolongs the life of the battery 27. Since the sensing unit 20 directly acquires samples in a so-called compressed domain, the explicit step of data compression, and its impact on sample rate, is completely avoided. This advantageously results in a power savings and simpler circuit realizations in the sensing unit 20.

The compressive sensing circuit 30 may be configured as an analog-to-digital converter (ADC) or digitizer, as readily appreciated by those skilled in the art. The compressive sensing circuit 30 operates at a sampling rate less than the Nyquist rate on the filtered modulated analog signal. The sample rate may be represented as $T_{S\_ADC}$, which is much greater than the chip rate $T_C$ of the bi-phase modulating signal.

The sensing method of the sensor unit 20 is operative to follow a Random Demodulator as readily understood by those skilled in the art. However, to complete a communication link providing both forward error correction (FEC) and information assurance (IA), the typical random demodulator approach is augmented with compressively encoded symbols into the data stream for the express purpose of correcting channel errors and detecting that the message was generated by an authorized user. These last two features are unique aspects of the illustrated sensing and recovery system 10. The FEC and IA data are also available to be encoded into the transmission stream.

A data integrity module 36 adds data integrity check symbols to the compressed sensed signal. The data integrity module 36 generates the integrity check symbols based on a matrix 37, wherein the matrix may be randomly generated based on a received IA key or seed. This allows the receiving unit 60 to know if the message is authentic. Otherwise, the receiving unit 60 may be susceptible to being spoofed. The sensing unit 20 also includes a forward error correction (FEC) module 38 to add parity check symbols to the compressed sensed signal. This allows correction by the recovery unit 60 for any errors that may be introduced in the communications channel due to noise.

In this non-limiting example, more particularly, the authentication symbols are appended to the symbols of the data stream. As a non-limiting example, when the authentication symbols are considered already in the digital domain, a standard compressive sensing technique (i.e., a random matrix) may be applied to the IA data to create the compressively sensed symbols in the data frame. Given the IA data is of a different format than the analog source data, the sensing unit 20 is operative to encode the authentication word using an ancillary compressive sensing circuit.

Further, the IA symbols are programmed in the sensing unit 20 using a means suitable per the end application (e.g., hardwired, commanded, etc.) a-priori to data transmission. The IA source data is selected such that it will be sparse in the same domain as the source data signal to be transmitted. The advantage of this encoding method is that a common recovery circuit for the data stream and IA symbols may be used in the recovery unit 60. Otherwise, separate recovery systems for the data and IA symbols can be used, but at the cost of additional complexity in the recovery unit 60.

The IA encoding mechanism and the position of the IA samples in the compressively sensed data stream are both known to the recovery unit 60. After the IA "compressed" IA symbols are appended to the data payload, FEC is applied to complete the symbol block. The FEC is applied using any suitable traditional coding approach (e.g., block, convolution, turbo) so long as the recovery unit 60 is apprised of the location of the FEC symbols. The FEC symbols need not be compressively encoded as channel errors may cause catastrophic errors in signal recovery. However, using compressive techniques to provide FEC is not excluded.

In the recovery unit 60, the signal reconstruction unit 62 will form a matrix V which maps the sparse data coefficients (i.e., the data and IA symbol stream) to the compressed measurements. That is, the received signal $y=V\alpha$ in vector form, where the original signal x can be represented in vector form based on a basis $\Psi$ and expansion coefficients $\alpha$ associated therewith. In other words, $x=\Psi\alpha$ in vector form. The elements of the $\Psi$ matrix depend on the bi-phase sequence and the sparsification transform in the sensing unit 20. The resulting constrained optimization problem is expressed as minimizing the L−1 norm of the $\alpha$ subject to the constraint of $y=\Phi\Psi\alpha$.

Solving the resulting under-constrained equation using an L−1 norm produces a set of sparse coefficients. The resulting sparse coefficients are then converted back to signal samples and IA samples, using an assumed sparsification transform, that would have been acquired had the entire process been executed at the Nyquist rate.

The sensing unit 20 can further randomize its operation to further insure that unauthorized terminals cannot intercept or transmit compatible data streams. The additional randomization includes randomization of the seed values generating the bi-phase modulation signal and the seed generating the IA compressed symbol stream. The randomization can be applied as a randomly selected start value and/or during a transmission randomly resetting the random generators with new seed values.

An inherent benefit of this is that the transmitted compressed sensed signal now has an even lower probability of intercept (LPI). Since the seed controls the exact nature of the bi-phase sequence, the more often the seeds are changed, then the more difficult it is to intercept the transmitted compressed sensed signal.

However, offsetting some of the benefit of additional randomization for signal protection, is the increased complexity in the recovery unit 60, where the seed changes need to be likewise synchronized to alterations in the sensing unit 20. There are many methods (e.g., GPS-based, order wire, etc.) that can be used as readily appreciated by those skilled in the art.

The overall system 10 is operative to accept a bandlimited continuous time analog signal in the sensing unit 20. In order for the compressive paradigm to be applicable, the signal is assumed to be sparse in some basis $\Psi$. Depending on the type of signal, certain basis are better suited for certain types of signals, as also readily understood by those skilled in the art. Many naturally occurring and man-made signals are known to have a sparse representation (i.e., a few non-zero weights in the linear combination of basis vectors) in some transform basis (e.g., Fourier, DCT, wavelets, etc.). The sensing unit 20 does not need to know the basis nor compute with it. However, the recovery unit 60 needs to know the basis, or as a minimum, assume a basis that sufficiently sparsely represents the signal.

Figure 3:
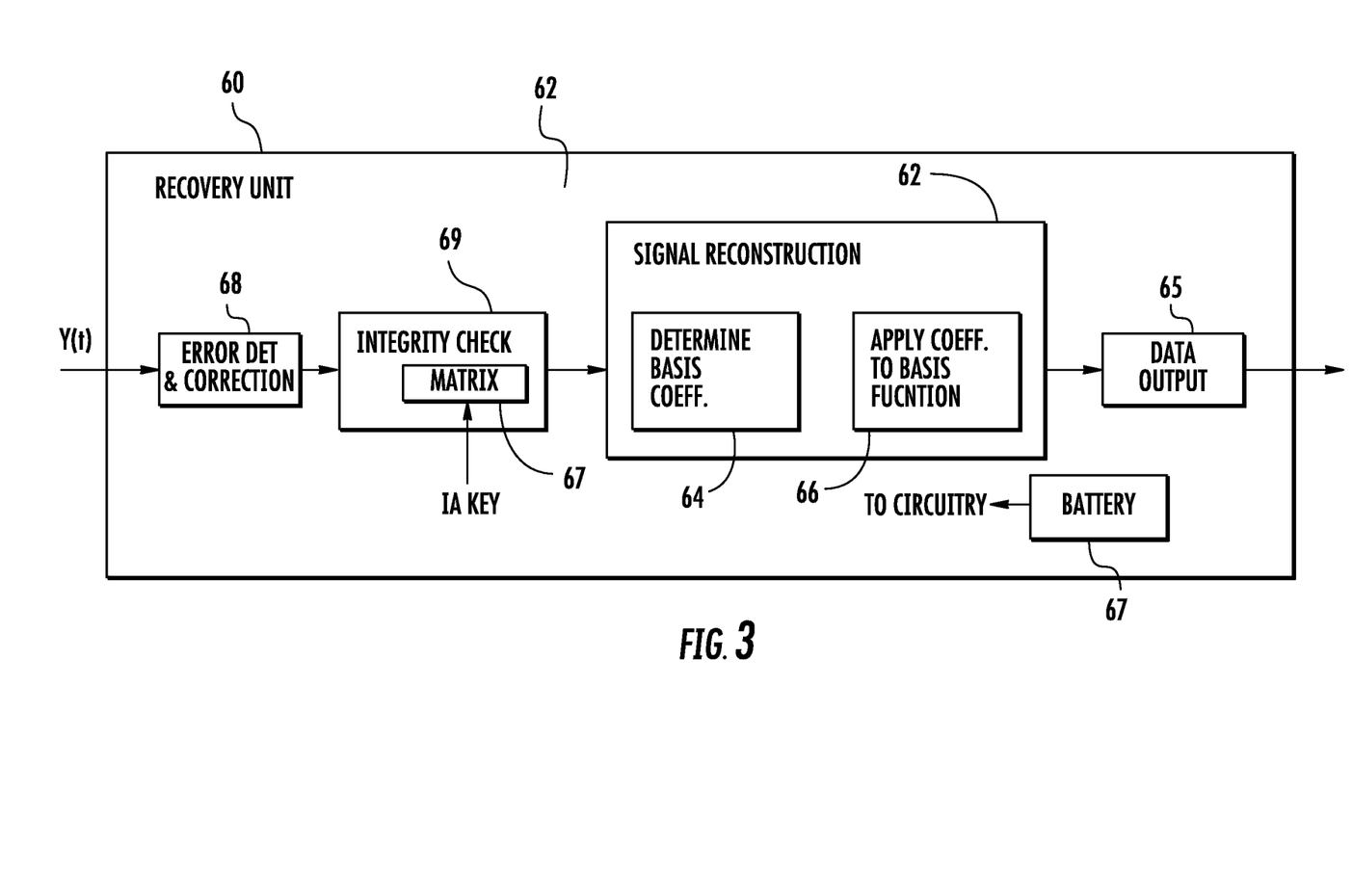
FIG. 3 is a more detailed block diagram of the recovery unit shown in FIG. 1.

A more detailed block diagram of the recovery unit 60 will now be discussed in reference to FIG. 3. The received encoded data is first passed to an error detection and correction module 68 that corrects for any errors as determined based on the parity check symbols added by the FEC module 38 in the sensing unit 20. Channel errors, if left uncorrected, will likely make reconstruction of the data completely incorrect.

The received encoded data after error correction is then passed to an integrity check module 69 to determine if the sensing unit 20 is authorized. The integrity check module 69 compares the data integrity check symbols added by the data integrity module 36 in the sensing unit 20. The integrity check module 69 generates the integrity check symbols based on a random sensing matrix 67, which is similar to those used in standard approaches to discrete signal compressive sensing, as readily appreciated by those skilled in the art. The matrix 67 in the integrity check module 69 and the matrix 37 in the data integrity module 36 generate values based on the same IA key or seed that is known between the two modules. If the data integrity check symbols added by the data integrity module 36 in the sensing unit 20 are verified by the recovery unit 60, then the sensing unit 20 is authorized and the received encoded data after error correction is passed to the signal reconstruction circuit 62.

If the sensing unit 20 is not authorized, then the recovery unit 60 ignores the received encoded data after error correction. If the sensing unit 20 is authorized, then the received encoded data after error correction recovered data is passed to the signal reconstruction circuit 62.

The recover unity 60 includes a signal reconstruction circuit 62 that receives the transmitted compressed sensed signal y, which is a sequence of discrete time outputs. As noted above, the transmitted compressed sensed signal $y=\Phi\Psi\alpha$. The recovery unit 60 knows the sensing time varying and "randomly chosen" matrix $\Phi$. The recovery unit 60 also knows the basis $\Psi$, for expressing the signal.

Alternatively, the recovery unit 60 may operate properly even if a different but suitable basis is used, as noted above. There are many sparsification transforms that may be used to represent the sensed data. Depending on the data being sensed, certain basis are better suited. The data at least needs to be sparse in an anticipated basis that is acceptable for the recovery unit 60, otherwise the process will not work.

The signal reconstruction circuit 62 recovers the compressed sensed signal using two steps. The first step is performed by the determine basis coefficients section 64, which performs a constrained optimization to solve for the basis coefficients $\alpha$. The constrained optimization is based on the L1-norm function. The second step is performed by applying the coefficients to the basis section 66, which applies the coefficients $\alpha$ to the basis $\Psi$ to determine x(t). The recovery unit 60 is able to reconstruct what the Nyquist samples would have been had they had been digitally sampled with a conventional system. The recovered data is passed to a data output module 65.

Figure 4:
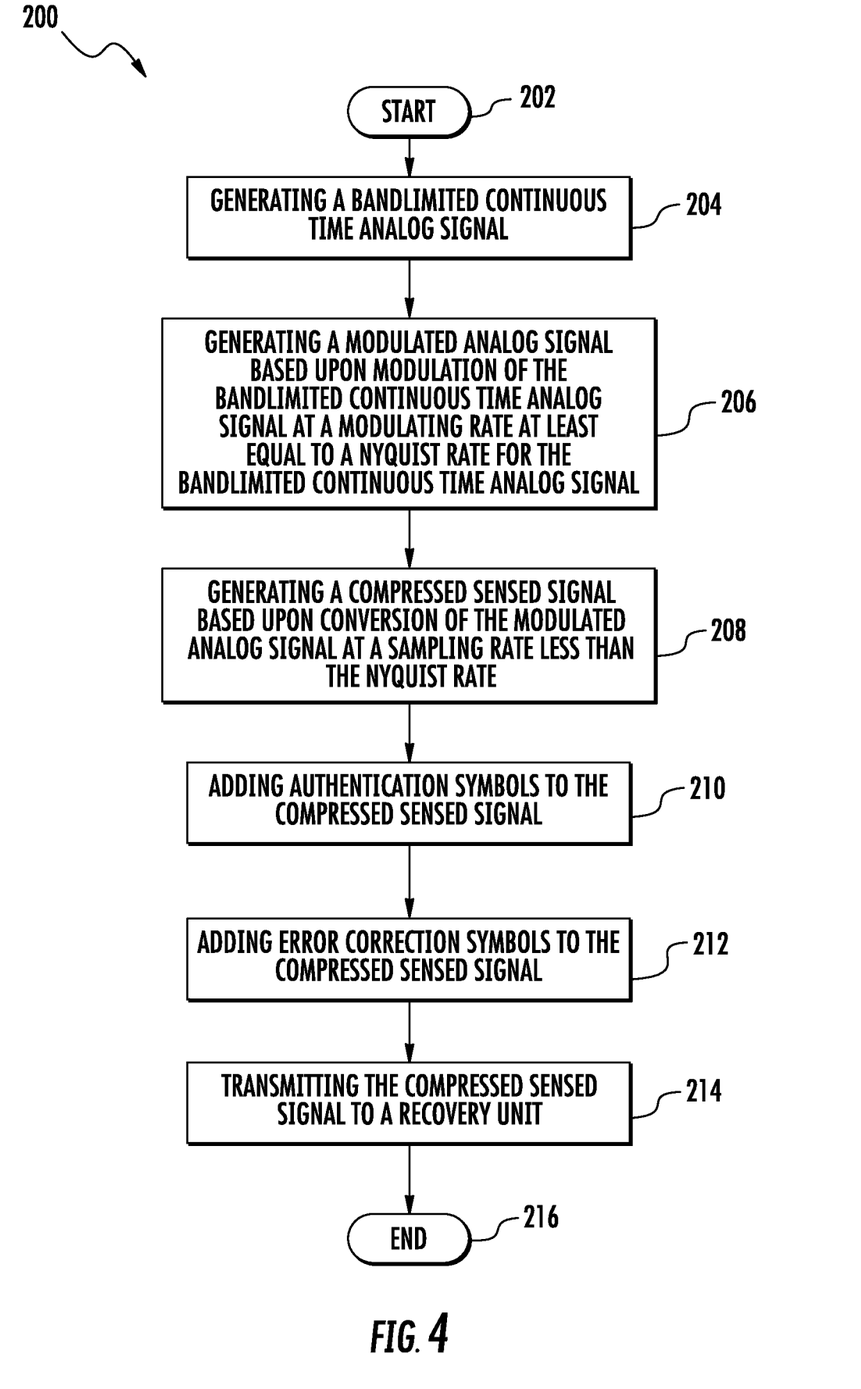
FIG. 4 is a flowchart illustrating a method for sensing data in accordance with the present invention.

A flowchart 200 illustrating a method for sensing data will now be discussed in reference to FIG. 4. From the start (Block 202), the method comprises generating a bandlimited continuous analog signal at Block 204, and generating a modulated analog signal based upon modulation of the bandlimited continuous time analog signal at a modulating rate at least equal to a Nyquist rate for the bandlimited continuous time analog signal at Block 206. A compressed sensed signal is generated at Block 208 based upon conversion of the modulated analog signal at a sampling rate less than the Nyquist rate. Authentication symbols are added to the compressed sensed signal at Block 210 and error correction symbols are added to the compressed sensed signal to protect the overall message from the effects of channel errors at Block 212. The method further comprises transmitting the compressed sensed signal to a recovery unit 60 at Block 214. The method ends at Block 216.

A more detailed explanation on compressive sensing will now be provided. Compressive sensing deals with the problem of acquiring an M×1 discrete-time signal vector of samples, denoted as y and referred to as compressed measurements, to represent a signal x(t) that is K-sparse or compressible in some domain. We denote the sparisification transform employed in the receiver as $\Psi(t)$. Generally the sparisification transform is time non-adaptive, however, this possibility is not excluded.

Compressive sensing has been traditionally applied to data that is already discretized in some fashion (e.g., pixilated data, time series), and the compressive sensing concept is useful to reduce data storage or transmission requirements. The mathematics are fairly straightforward matrix-vector equations. The discrete data domain serves as a good place to introduce compressive sensing, and builds an insight for how compressive sensing can be used to acquire analog signals at sub-Nyquist rates, and reconstructed with zero error (or as if the signals were Nyquist sampled to begin with). Some important characteristics affecting the hardware design of this technique are that sampling is non-adaptive and periodic. So the acquisition circuitry is somewhat agnostic to the input signal.

A way to formulate (in discrete-time) to the compressed samples is the following. Consider a discrete-time vector $x \in \mathcal{R}^{N\times 1}$ and a random matrix $\Phi \in \mathcal{R}^{M\times N}$ and form the samples (measurement or observations) y as, $y=\Phi x \in \mathcal{R}^{M\times 1}$. There is a limit as to how small M can be selected when K is fixed. K is influenced by the choice of the basis. A typical rule of thumb, when using the L1-norm for recovery, is M~0(2K log(N/M)). When the representation of the vector x is expressed in the sparse basis we obtain, $x=\Psi\alpha \in \mathcal{R}^{N\times 1}$.

Then by combining equations, the following is obtained: $y=\Phi\Psi\alpha=V\alpha \in \mathcal{R}^{M\times 1}$. The original vector x can be recovered exactly by solving a convex optimization using the L1-norm with equality constraints. Namely, min $\Sigma_{k=1}^{N}|\alpha_k|$ such that $y=V\alpha \in \mathcal{R}^{M\times 1}$. The original data is then recovered using $x=\Psi\alpha \in \mathcal{R}^{N\times 1}$.

The recovery problem is ill-posed in the matrix-vector form. There are an infinity of solutions because there are more unknowns than equations. It is the fact that the signal is assumed sparse in a basis allows the recovery process to operate. If the signal is not sparse directly in the domain of the samples that create the observations a sparsification transform must be found to implement the process. This line of thinking will be useful when the concepts are transferred to the compressive sensing of analog signals.

However, as a special case, if the data vector x is already sparse, say in the discrete-time domain, it does not need to be made further sparse. It can be directly used in the above formulation without introducing the matrix $\Psi$ at all. In this case the equations become $y=\Phi x \in \mathcal{R}^{M\times 1}$ (data to observations). The sparse data is recovered using the known random matrix $\Phi$, using the same type of convex optimization using the L1-norm with equality constraints, which in this case is, min $\Sigma_{n=1}^{N}|x_n|$ such that $y=\Phi x \in \mathcal{R}^{M\times 1}$. The optimization yields the original N×1 vector x directly from the M×1 measurement vector y.

Application to continuous time signals will now be discussed. Discrete time samples may be created from a continuous time signal as if it were Nyquist sampled, yet at a lower than Nyquist sample rate for the digitizer. The first issue is how to convert the continuous time system into a form amenable to the matrix-vector formulation given in the previous sections.

First, it is assumed that the analog signal has a finite information rate, so then it is reasonable to assume that it can be represented by a finite number of parameters per unit time in some continuous basis. Namely the expansion $$x(t) = \sum_{k=1}^{N} \alpha_k \psi_k(t)$$

is valid. The choice of the basis functions is dictated by how few coefficients the user wishes to have as non-zero. A guideline is that sparser representations are preferred. Note that since N coefficients are allowed, in the "worst case" in the sense that the components cannot be ignored, the basis functions could be a sequence of time-shifted sine functions or some other Nyquist pulse shape, and each coefficients are the functional values at each (sampling) instant.

While each dictionary function may have a high bandwidth, the signal expressed in the basis has relatively few degrees of freedom. Ideally, the signal could be sampled at some multiple level of the sparsity rather than twice the bandwidth as dictated by the Nyquist theorem.

The acquisition system has 3 parts: the random modulator, filtering and uniform sampling. The random modulator 24 uses a chipping sequence. The sequence is as fast or faster than the Nyquist rate of the input signal. The purpose of the modulation is to spread the frequency content so that is it not destroyed by the LPF 26. The spread signal is filtered, and sampled in an analog-to-digital converter 32 at a rate T<<Nyquist rate.

To recover the original signal as if it were originally Nyquist sampled, the observations are expressed in a matrix-vector formation suitable for the L1-norm optimization, min $\Sigma_{k=1}^{N} |\alpha_k|$ such that $y = V\alpha \epsilon \mathcal{R}^{M \times 1}$.

The matrix V is to be determined. To derive it, the following is noted:

$$y[m] = \int x(\tau) p_c(\tau) h(mT - \tau) d\tau$$

$$y[m] = \sum_{k=1}^{K} \alpha_k \int \psi_k(\tau) p_c(\tau) h(mT - \tau) d\tau$$

To recover a matrix-vector relationship of $y = V\alpha$, the entries of V are defined as follows: $V_{m,n} = \int \psi_k(\tau) p_c(\tau) h(mT - \tau) d\tau$. All three functions are known to the recovery unit 60.

The sensing matrix $\Phi$ will now be discussed. In a discrete system the sensing matrix $\Phi$ may ideally be Gaussian, because many of the provable results are for random matrices with Gaussian entries. However, as a practical matter, a random matrix where the rows are outcomes of a repeated Bernoulli trial yield results commensurate with the Gaussian theory. This observation on discrete-time system processing led to the inclusion of the chipping sequence in the continuous time version, notwithstanding the fact that it is straightforward to build a bi-phase modulator 24. Chaotic versions have also been shown to provide provably good results. Also, the nature of the sampling matrix $\Phi$ must be selected so that it is noncoherent with the sparsification transform $\psi$.

There is a decrease in SNR in the recovery stage when there is noise in the system. Given an input SNR in the original (uncompressed signal) and the compressively sensed measurements, a 3 dB/octave penalty is paid. This is due to the wideband noise folding into a narrow band output from the analog-to-digital 32.

When the source signal has noise induced by some mechanism (e.g., external coupling, circuitry preceding random demodulator, random demodulator components, quantization noise, etc.) the L1-norm recovery process (i.e., L1-norm recovery with equality constraints) is modified. In this case, a quadratically constrained L1-norm is used, as follows:

$$\min \Sigma_{k=1}^{N} |\alpha_k| \text{ such that } \|y - V\alpha\|_2^2 < \epsilon$$

In this case, the recovery is again a 2-step process, just as in the above sub-Nyquist application. First, solve the constrained optimization problem using $y = V\alpha$ as the constraint equation. Then, transform the $\alpha$ vector into the desired source signal s using the relations $s = \psi \alpha$. Also in this case, since $\psi \neq I$ a dictionary entry that induces sparseness must also be remembered by the source compression system, as well as the random sensing matrix $\Phi$, since together they form V.

Another aspect is to apply compressive sensing to a data system to securely transmit and retrieve source data files with respect to a remote data storage facility. As will be explained in greater detail below, random generation of the sensing matrix may advantageously provide an unlimited number of 1-time encryption pads when generating compressed sensed data files. In effect, the sensing matrix is being used as an encryption key.

Figure 5:
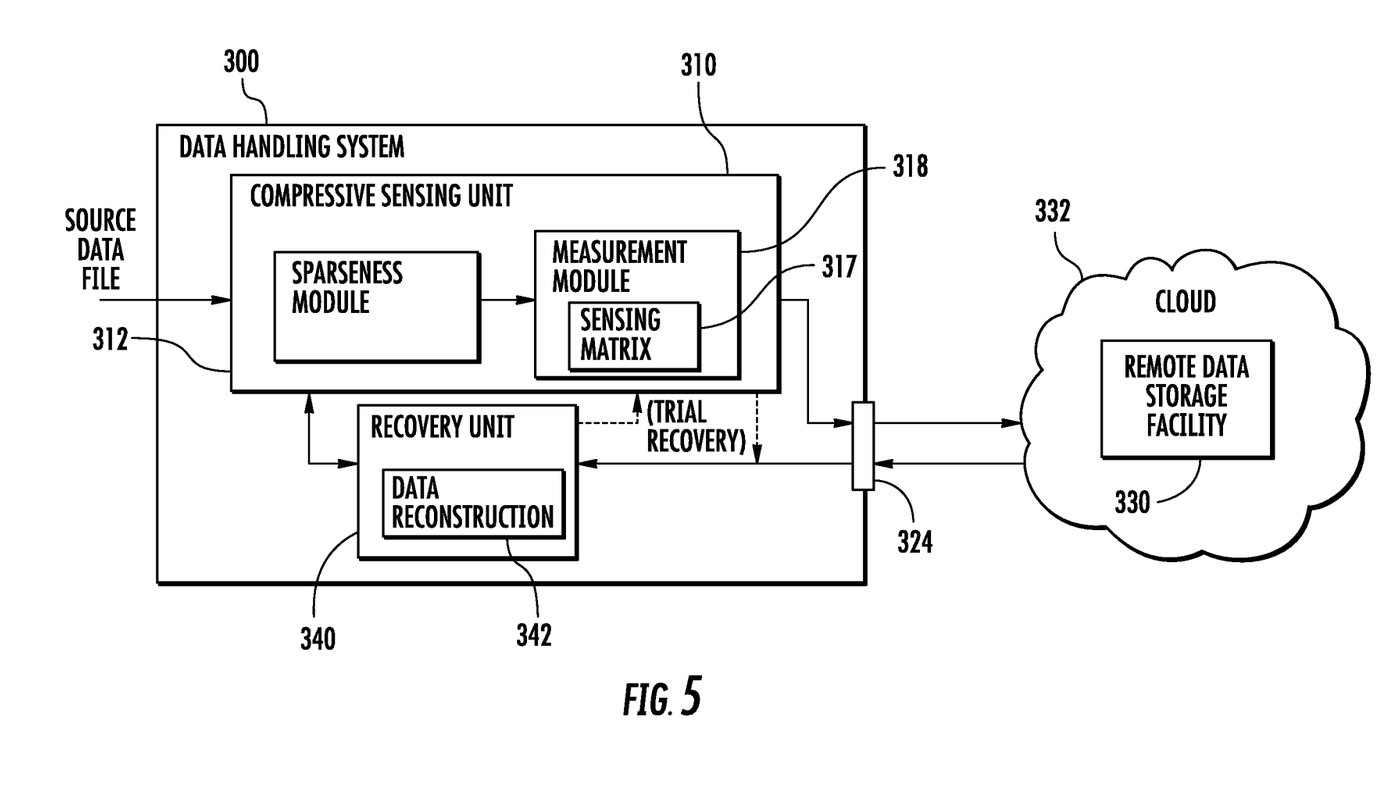
FIG. 5 is a block diagram of a data handling system interfacing with a remote data storage facility in accordance with the present invention.

Referring now to FIG. 5, a data handling system 300 includes a compressive sensing circuit 310 configured to receive a source date file. The data handling system 300 may generate the source data file, or may receive the source data file from an external source.

The compressive sensing circuit 310 includes a sparseness module 312 and a measurement module 318. The sparseness module 312 generates a sparse source data file by inducing sparseness into the source data file. As will be explained in greater detail below, sparseness may be introduced based on direct embedding or a sparsification transform.

The measurement module 318 generates the sparse source data file (i.e., the compressive samples) based on a sensing matrix 317 to generate a compressed sensed source data file. The compressed sensed source data file is to be transmitted to a remote data storage facility 330 for storage. The remote data storage facility 330 is also referred to as cloud storage since the compressed sensed source data file is sent over the Internet 332 via interface 324 to the remote data storage facility 330.

A recovery unit 340, at some point later in time, retrieves the compressed sensed data file from the remote data storage facility 330. The recovery unit 340 generates the source data file based on application of the same sensing matrix 317 used by the measurement module 318. A data reconstruction module 342 within the recovery unit 340 reconstructs the same sensing matrix. The source data file cannot be recovered without using the same sensing matrix. In effect, the sensing matrix is being used as an encryption key.

The recovery unit 340 is also configured to perform a trial recovery of the compressed sensed source data file prior to being transmitted to the remote data storage facility 330 for storage, and if the trial recovery is successful, then perform the transmitting. The measurement module 318 is configured to re-generate the compressed sensed source data file from the sparse source data file and based on a new sensing matrix if the trial recovery is unsuccessful. The recovery unit 340 is configured to perform a trial recovery on the re-generated compressed sensed source data file prior to being transmitted.

The trial recover feature of the data handling system 300 guards against the possibility that the random entries chosen to encode the data in the sensing matrix 317 lack the proper structure to successfully recover the data. The trial recovery feature circumvents the issue by repeatedly generating sensing matrices 317 and applying them to the source data until the trial recovery is successful.

Figure 6:
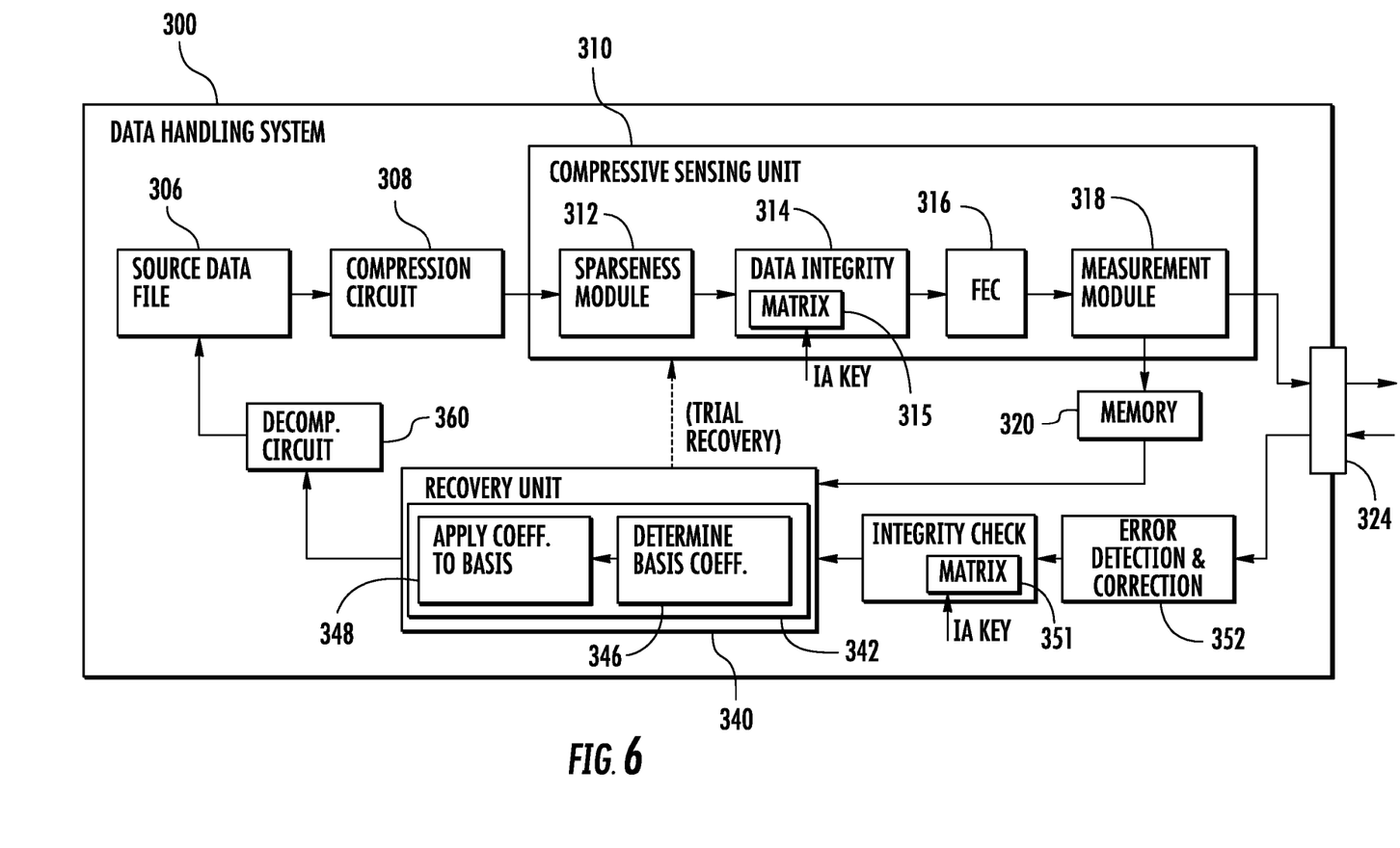
FIG. 6 is a more detailed block diagram of the data handling system shown in FIG. 5.

A more detailed block diagram of the data handling system 300 will now be discussed in reference to FIG. 6. The illustrated data handling system 300 includes a buffer or memory 306 to initially receive the source data file. A compression circuit 308 compresses the source data file by removing redundancy therein. The compression circuit 308 is not limited to any particular compression algorithm. Instead, the choice of the compression algorithm may be dictated by the nature of the source data file, as readily understood by those skilled in the art.

The sparseness module 312 induces sparseness into the compressed source data file. The sparseness may be induced by direct embedding or by a sparsification transform.

Direct embedding will be discussed first. For discussion purposes, it is assumed that the output of the compression circuit 308 is a vector c, where c has dimensions B×1, and B denotes the number of bits in the source data file. Typically, the compressed file is not sparse as compression (e.g., JPEG, MPEG, ZIP, etc.) seeks to make the file as small as possible. It is possible to expand the file size (i.e., induce sparseness) by embedding the file (the vector c) into a much larger all zero vector resulting in a vector s of dimensions kB×1, where k is a suitably large multiplier (e.g., typically 5-10 or more).

One way to embed the data vector c into the required sparse vector s is the following: $s=[c', 0, 0, 0, 0, 0, \ldots 0]'$. Of course, any method for dispersing the data is readily acceptable. Since a sparse vector is available, the transformation from source data into a sparse vector, namely $\psi$, is the identity matrix (in this case). So with $\psi=I$, the relation $y=V\alpha=\phi\psi\alpha=\Phi s$ as before in the sub-Nyquist application. The dimensions of $\Phi$ are M1×kB.

Since $\psi=I$, the constrained L1 recovery can be cast directly using the constraint equation $y=V\alpha=\phi\alpha=\Phi s$. In other words, the sparse representation $\alpha$ is the same as the data s out of the induce sparseness module 312 (which as explained above is by construction sparse).

The main advantage of this technique over the other approach of using a sparsification transform is that no sparsification transform is necessary. However, a penalty may be paid in the sense that the data y sent to the cloud may be larger as compared to using the sparsification transform. When the recovery is performed, the data recovered (in the known embedded locations) is the data needed by the recovery unit 340 for information recovery. In other words, the sparse recovery is one step since $\psi=I$.

In the sparsification transform approach to induce sparseness, the data vector from the compression circuit 308, denoted above as the vector c, is used again. This time, the data vector c is used directly and tested against various dictionaries (i.e., sets of $\psi$'s or equivalently different $\psi$ matrices) to see if the combination of data and a dictionary entry admit a sparse set of coefficents, namely the $\alpha$ vector. This is represented mathematically as $c=s=\psi\alpha$, where $c=s$ because the source signal to be compressively sensed is the vector c.

If there is no sparse representation of the source data c, then compressive sensing will fail. But assuming that either a sparse transform is known a-priori or can be learned online from the data, then the vector c is passed through the sparseness module 312, and the measurements y to be archived in the cloud are formed as $y=\Phi s=\Phi c=\Phi\psi\alpha=V\alpha$. Namely, the vector c (B×1) is taken and the random sensing matrix (M2×B, M2<<B) is applied to the data, wherein the result y is stored in the cloud.

As a result of the reduction in size of the source vector and the possible efficient representation induced by a suitably chosen $\psi$ matrix, M2 may be much smaller than M1, yielding improved output memory efficiency. The penalty paid for such an efficiency is that a suitable sparsification transform must be known a-priori or learned.

In this case, the recovery is again a 2-step process, just as in the above sub-Nyquist application. First, solve the constrained optimization problem using $y=V\alpha$ as the constraint equation. Then, transform the $\alpha$ vector into the desired source signal s using the relation $s=\psi\alpha$. Also in this case, since $\psi\neq I$ a dictionary entry that induces sparseness must also be remembered by the source compression system, as well as the random sensing matrix $\Phi$, since together they form V.

Just as in the sub-Nyquist application, it is permissible that different $\psi$ matrices may be better than others as a signal's time record evolves. There is no restriction that one $\psi$ matrix be used for an entire file to be stored. All that is required is that the recovery unit 340 know when to switch among the dictionary choices and what those choices are.

After the sparseness module 312, the compressive sensing circuit includes a data integrity module 314 and a forward error correction (FEC) module 316 to further enhance the confidentiality and integrity of the data. As discussed above, the data integrity module 314 adds data integrity check symbols to the source data file. The data integrity module 314 generates the integrity check symbols based on a matrix 315, wherein the matrix may be randomly generated based on a received IA key or seed. This allows the recovery unit 340 to know if the retrieved source data file is authentic and has not been altered or tampered. As also discussed above, the FEC module 316 adds parity check symbols to the source data file. This allows correction by the recovery unit 340 for any errors that may be introduced.

The measurement module 318 is configured to randomly generate each sensing matrix 317 based on a polynomial and a seed, as readily understood by those skilled in the art. In one embodiment, the measurement matrix 318 includes a chaotic generator to chaotically generate the seed for each respective sensing matrix 317.

A memory 320 is coupled to the measurement module 318 and the recovery unit 340 to store the polynomial and the seed for each respective sensing matrix 317. The recovery unit 340 reconstructs the same sensing matrix 317 based on the stored polynomial and seed to generate the source data file. The measurement module 318 also stores a time stamp in the memory 320 corresponding to when the sensing matrix 317 was generated. The time stamp is used to identify the seed used to generate the sensing matrix 317. The recovery unit 340 retrieve the seed from the memory 320 to generate the sensing matrix 317 based on the time stamp associated therewith.

The recovered source data file is passed to an error detection and correction module 352. The error detection and correction module 352 corrects for any errors as determined based on the parity check symbols added by the FEC module 316 in the compressive sensing unit 310.

An integrity check module 350 is then used to determine if the source data file is authentic. The integrity check module 350 compares the data integrity check symbols added by the data integrity module 314 in the compressive sensing unit 310. The integrity check module 350 generates the integrity check symbols based on a matrix 351. The matrix 351 in the integrity check module 350 and the matrix 315 in the data integrity module 314 generate values based on the same IA key or seed that is known between the two modules.

If the data integrity check symbols added by the data integrity module 314 in the compressive sensing unit 310 are verified by the recovery unit integrity check module 350, then the recovered source data file is accepted. The accepted source data files are then passed to the recovery unit 340. Otherwise, the retrieved source data file is ignored, which means that the source data file has been altered or tampered.

The data reconstruction circuit 342 within the recovery unit 340 recovers the source data file from the compressed sensed source data file retrieved from the remote data storage facility 330 using two steps and based on the sensing matrix 317. The first step is performed by the determined basis coefficients module 346, which performs a constrained optimization to solve for the basis coefficients α. The constrained optimization is based on the L1-norm function. The second step is performed by the apply coefficients to basis module 348, which applies the coefficients α to the basis ψ to determine x(t), which is equal to ψα. The recovery unit 340 is able to reconstruct the compressed source data file based on the same sensing matrix 317 used by the compressive sensing unit 310.

A decompression circuit 360 corresponding to the compression circuit 308 decompresses the reconstructed source data file which may then be stored in the memory 306.

Figure 7:
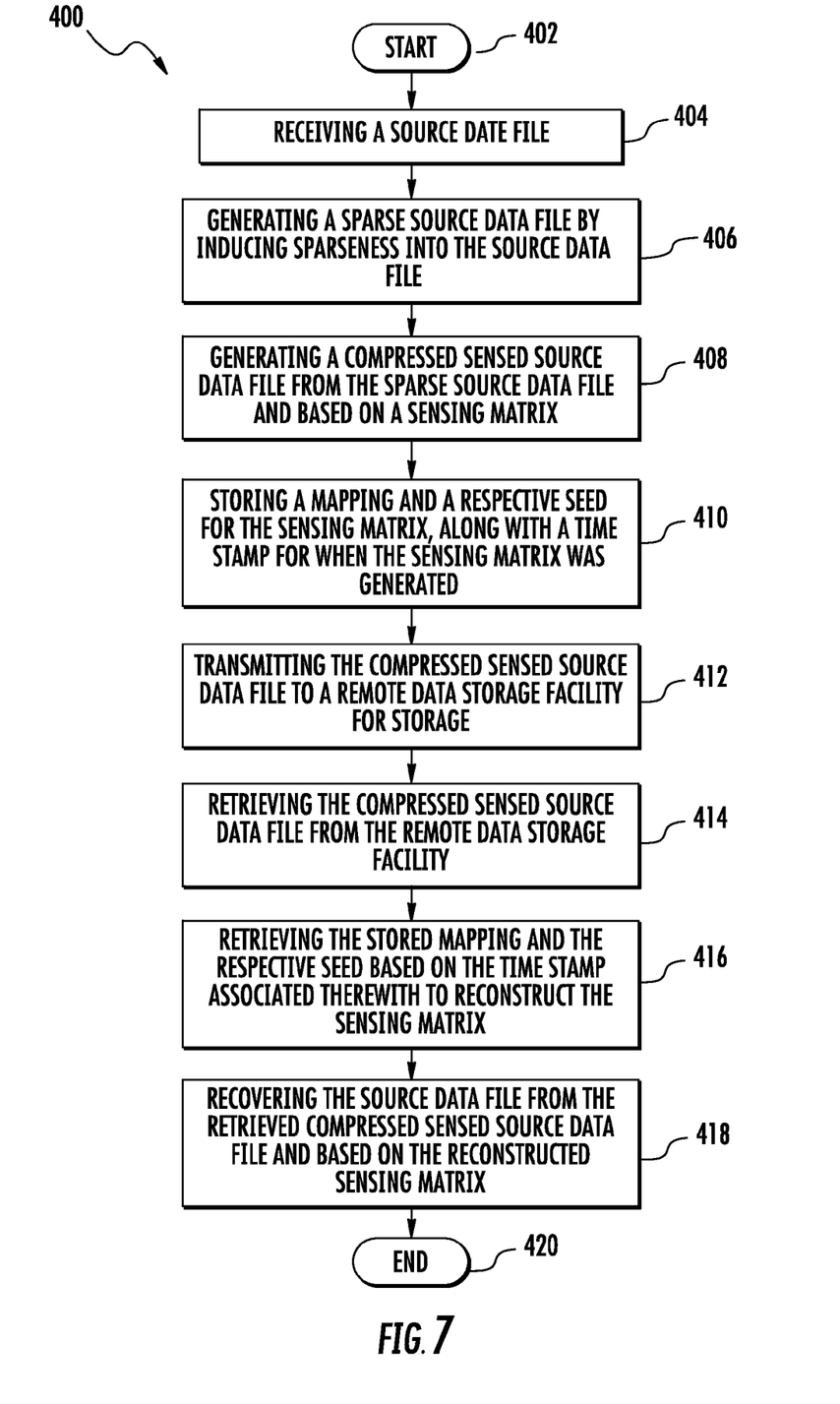
FIG. 7 is a flowchart illustrating a method for operating a data handling system in accordance with the present invention.

A flowchart 400 illustrating a method for operating a data handling system 300 will now be discussed in reference to FIG. 7. From the start (Block 402), the method comprises receiving a source date file at Block 404, and generating a sparse source data file by inducing sparseness into the source data file at Block 406. A compressed sensed source data file is generated at Block 408 from the sparse source data file and based on a sensing matrix.

A mapping and a respective seed used in generating the sensing matrix are stored in a memory 320 at Block 410. The compressed sensed source data file is transmitted to a remote data storage facility 330 for storage at Block 412. The compressed sensed source data file is later retrieved from the remote data storage facility 330 at Block 414. The method further comprises at Block 416 retrieving the stored mapping and the respective seed based on the time stamp associated therewith to reconstruct the sensing matrix. The source data file is recovered from the retrieved compressed sensed source data file and based upon the reconstructed sensing matrix at Block 418. The method ends at Block 420.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A sensing and recovery system comprising:
    a sensing unit comprising
        a sensor configured to generate a bandlimited continuous time analog signal,
        a modulator coupled to said sensor and configured to generate a modulated analog signal based upon modulation of the bandlimited continuous time analog signal at a modulating rate at least equal to a Nyquist rate for the bandlimited continuous time analog signal, and
        a compressive sensing circuit coupled to said modulator and configured to generate a compressed sensed signal based upon conversion of the modulated analog signal at a sampling rate less than the Nyquist rate; and
    a recovery unit coupled to said sensing unit and configured to recover the bandlimited continuous time analog signal from the compressed sensed signal.

2. The system according to claim 1 wherein said compressive sensing circuit comprises an analog-to-digital converter.

3. The system according to claim 1 wherein said sensing unit and said recovery unit are configured to be synchronized.

4. The system according to claim 1 wherein said recovery unit is configured to recover the bandlimited continuous time analog signal based on a basis function.

5. The system according to claim 4 wherein said recovery unit is configured to determine basis coefficients from the compressed sensed signal, and to apply the basis coefficients to the basis function to recover the bandlimited continuous time analog signal.

6. The system according to claim 1 wherein said sensing unit further comprises a forward error correction (FEC) module configured to add error correction symbols to the compressed sensed signal.

7. The system according to claim 6 wherein said receiving unit further comprises an error detection and correction module configured to correct for errors in the compressed sensed signal based on the error correction symbols added by said FEC module.

8. The system according to claim 1 wherein said sensing unit further comprises a data integrity module configured to add authentication symbols to the compressed sensed signal.

9. The system according to claim 8 wherein said data integrity module is configured to generate the authentication symbols based on a randomly generated matrix.

10. The system according to claim 9 wherein said receiving unit further comprises an integrity check module configured to authenticate said sensing unit based on the authentication symbols added by said data integrity module.

11. The system according to claim 10 wherein said integrity check module is configured to generate the authentication symbols based on the same randomly generated matrix.

12. The system according to claim 1 wherein said modulator comprises a bi-phase modulator.

13. A sensing unit comprising:
    a sensor configured to generate a bandlimited continuous time analog signal;
    a modulator coupled to said sensor and configured to generate a modulated analog signal based upon modulation of the bandlimited continuous time analog signal at a modulating rate at least equal to a Nyquist rate for the bandlimited continuous time analog signal; and
    a compressive sensing circuit coupled to said modulator and configured to generate a compressed sensed signal based upon conversion of the modulated analog signal at a sampling rate less than the Nyquist rate.

14. The sensing unit according to claim 13 wherein said compressive sensing circuit comprises an analog-to-digital converter.

15. The sensing unit according to claim 13 further comprising a forward error correction (FEC) module configured to add error correction symbols to the compressed sensed signal.

16. The sensing unit according to claim 13 further comprising a data integrity module configured to add authentication symbols to the compressed sensed signal.

17. The sensing unit according to claim 16 wherein said data integrity module is configured to generate the authentication symbols based on a randomly generated matrix.

18. The sensing unit according to claim 13 wherein said modulator comprises a bi-phase modulator.

19. A method for sensing data comprising:
generating a bandlimited continuous analog signal;
generating a modulated analog signal based upon modulation of the bandlimited continuous time analog signal at a modulating rate at least equal to a Nyquist rate for the bandlimited continuous time analog signal; and
generating a compressed sensed signal based upon conversion of the modulated analog signal at a sampling rate less than the Nyquist rate.

20. The method according to claim 19 further comprising transmitting the compressed sensed signal to a recovery unit.

21. The method according to claim 19 wherein the compressed sensed signal is generated using an analog-to-digital converter.

22. The method according to claim 19 further comprising adding error correction symbols to the compressed sensed signal.

23. The method according to claim 19 further comprising adding authentication symbols to the compressed sensed signal.

* * * * *